3,350,209
STABILIZED TOPPING

Edgar B. Rodgers, Philadelphia, Pa., assignor to Germantown Manufacturing Company, Philadelphia, Pa., a corporation of Pennsylvania
No Drawing. Filed Apr. 7, 1965, Ser. No. 446,407
7 Claims. (Cl. 99—139)

ABSTRACT OF THE DISCLOSURE

A stabilized whipped topping composition useful with a variety of confections, characterized by fine texture and homogeneity over prolonged periods of time; comprising vegetable fat, sugar caseinate, and emulsifier, water, and a stabilizer comprised of several defined components including a calcium lactylate ester in restricted amounts.

---

This invention relates to a stabilized topping for cakes, pies, puddings, jello and other desserts. It more particularly relates to an improved topping that is characterized by fine texture and homogeneity both as prepared and after prolonged storage. This invention also concerns a stabilized topping that can be frozen, stored and thawed, as desired, without any appreciable diminution of its valuable properties. It also relates to a stabilized topping that can be readily prepared by standard techniques, with the inclusion of selected flavoring and coloring, if desired, to meet the strictest requirements of gastronomical appeal.

The topping composition of this invention comprises, on a weight basis, 10 to 35%, preferably 24 to 27%, of vegetable fat, 5 to 16%, preferably 8 to 15%, of sugar, 2 to 5%, preferably 2.5 to 4.0%, of a stabilizer and water to make 100%. One must adhere rigidly to the components and ranges set forth in order to realize all of the valuable benefits of this invention. Otherwise, one obtains unsatisfactory textures from too thin to curdy, in which characteristic instability leads to commercial unacceptability.

The vegetable fats to be used are those well known to be derived from vegetable sources. They are composed of glyceryl esters of the higher fatty acids, both saturated and unsaturated. These higher fatty acids include myristic, palmitic, stearic, arachidic, oleic, linoleic, linolenic and the like. Particularly abundant in natural products are the glyceryl esters of palmitic, stearic and oleic acids, commonly referred to as tripalmitin, tri-stearin and tri-olein. Among the sources of these vegetable fats are coconut oil, safflower oil, soybean oil, cottonseed oil, peanut oil, olive oil and the like.

As is known in the art, these vegetable fats are actually mixtures of several of the various glyceryl esters, described hereinbefore. These naturally-occurring glyceryl esters can be either saturated or unsaturated. It is frequently desirable to hydrogenate, in a known manner to any desired degree the unsaturated components of the aforementioned glyceryl esters. Such hydrogenation frequently produces a solid or semi-solid paste from the original vegetable oil. This is usually desirable for the purposes of this invention. In the present sense, the term "vegetable fat" is to be construed to include the liquid, partially solid and solid forms, of the above-described glyceryl esters. Although in most instances, as a matter of convenience, a single vegetable oil or fat will be employed, it is quite satisfactory and often desirable, to employ two or more vegetable fats. Such plurality of components is within the gamut of this invention.

The sugar employed will usually be of the sucrose type, such as cane sugar, beet sugar, grape sugar, and the like, preferably cane sugar. Also, satisfactory for the present purposes is invert sugar, which is a hydrolysis product of sucrose and is the principal component of honey. Corn syrup, as such or concentrated to its solid form, is also very useful in this invention. Other sources of glucose are likewise useful. Here again, one may employ one or more of the above-defined sugars, as desired, and it is frequently desirable to employ blends of sucrose and glucose in the form of cane sugar and corn syrup solids, in any proportions.

The stabilizer employed in the compositions of this invention is comprised of several components. These, based on weight, include 48 to 62%, preferably 50 to 60%, of a caseinate, such as sodium, potassium or calcium, preferably sodium caseinate; 16 to 22%, preferably 17 to 21%, of sugar, as defined hereinbefore; 7 to 10%, preferably 7.5 to 9.5%, of a sorbitan partial ester of a higher fatty acid, in which the fatty acid has 12 to 20 carbon atoms, preferably 18 to 20 carbon atoms; 1.5 to 3.0%, preferably 1.8 to 2.8%, of a non-toxic emulsifier, such as the polyoxyethylene adducts of the above described sorbitan partial esters of a higher fatty acid; and 6 to 14%, preferably 7.5 to 12%, of a specific lactylate.

In addition to the above components, there may be employed in the stabilizer, as desired, 3 to 5% of table salt, 0.5 to 1.5% of a bodying agent, such as tragacanth, extract of Irish moss, gelatin, agar agar, pectin, and the like, preferably the extract of Irish moss (carrageen), and 0.05 to 0.25% of flavoring and coloring agents.

The sorbitan partial ester of a higher fatty acid used in the stabilizer is one in which the fatty acid is typically lauric, myristic, palmitic, stearic, oleic, linoleic or arachidic acid. The partial ester is derived from sorbitol. Typically, one may employ sorbitan monopalmitate, sorbitan monostearate, sorbitan monooleate, or the like, preferably sorbitan monostearate.

The non-toxic emulsifier may be any surface-active agent that will function as an emulsifier in the above-described system. The term "non-toxic" must be construed in the light of the fact that it is to be consumed by human beings. The polyoxyethylene chains must be of sufficient length to provide the necessary hydrophilic-hydrophobic balance in the molecule. The average value of polyoxy-ethylene chains will range from about 12 for the lower molecular weight fatty acids to about 25 for the higher molecular weight fatty acids. The preferred range will be about 16 to about 24. Preferred embodiments include sorbitan monooleate with 20 units of ethylene oxide and sorbitan monostearate with 20 units of ethylene oxide. It is often desirable to use both of these preferred embodiments in the same formulation, keeping in mind that the total of both must be in the range given hereinbefore.

The specific lactylate employed in the stabilizer may be represented by the formula

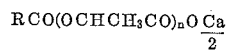

$$\text{RCO(OCHCH}_3\text{CO)}_n\text{O} \frac{\text{Ca}}{2}$$

in which
  $n$ is an integer of 1 to 5, and
  RCO is the acyl radical of a fatty acid containing from 12 to 24 carbon atoms.

The fatty acids contemplated within the definition of the acyl radicals, RCO, typically include, lauric, myristic, palmitic, stearic, oleic, linoleic, linolenic, arachidic, behenic, carnaubic, and the like, preferably stearic. The preferred embodiment of $n$ is two. Typical lactylates that may be used include calcium palmityl-3 lactylate, calcium arachidyl-2 lactylate, calcium myristyl-3 lactylate, calcium stearyl-2 lactylate, calcium linoleyl-2 lactylate, and calcium oleyl-2 lactylate. Preferred is calcium stearyl-2 lactylate.

Optionally, as mentioned previously, but usually, there are employed coloring and flavoring agents. These include B-carotene, egg coloring, various vegetable coloring agents, and various extracts and powders to impart flavors of lemon, strawberry, vanilla, banana, papaya, pineapple, chocolate, among others.

An especially superior composition, on a weight basis, is as follows:

|  | Percent |
|---|---|
| Vegetable fat | 26.00 |
| Cane sugar | 14.00 |
| Stabilizer | 3.54 |
| Water | 56.46 |
|  | 100.00 |

The stabilizer in the above composion consists of:

|  | Percent |
|---|---|
| Sodium caseinate | 2.000 |
| Sorbitan monostearate | 0.300 |
| Sorbitan monostearate having an average of 20 units of ethylene oxide | 0.050 |
| Sorbitan monooleate having an average of 20 units of ethylene oxide | 0.050 |
| Calcium stearyl-2 lactylate | 0.300 |
| Carrageen | 0.025 |
| Salt | 0.150 |
| Cane Sugar | 0.659 |
| B-carotene | 0.004 |
| Egg color | 0.002 |
|  | 3.540 |

The various components are incorporated to form the stabilized topping of this invention by techniques known to be acceptable in the art.

When preparing the topping emulsion we preferably add the sugar and stabilizer into the water while agitating gently to disperse and dissolve the stabilizer. For better and more rapid solubility of the stabilizer, the water used should be between 40° C. and 50° C.

The vegetable fat is finally added and the entire composition agitated and heated to raise the temperature between 70° C. and 80° C. The mixture is then held at this temperature for 20 to 30 minutes. At the end of the holding period the topping emulsion is formed by homogenization through a homogenizer utilizing the required pressures to make a stable emulsion. We have found a moderate pressure of 1000 pounds per square inch to give most satisfactory results, followed by a second homogenization at 200 pounds per square inch to reduce clumping of fat.

After homogenization, the topping emulsion is cooled and packaged in suitable containers for distribution.

The topping emulsion is held at 0° C. to 5° C. for usual periods of storage but can be quick frozen and held at minus 20° to minus 30° C. for long periods of time.

In any case, the stabilized topping of this invention consistently demonstrates enhanced properties of fineness of texture and continued homogeneity. The stabilized topping repeatedly performs with superior characteristics whether prepared as a mocca cream icing, a filling for nesselrode pie, a filling for ambrosia cream pie, a banana parfait icing, Bavarian cream filling or icing, or whatever delectable confection is contemplated.

I claim:
1. A stabilized whipped composition comprising, on a weight basis:
   (a) 10 to 35% of a vegetable fat
   (b) 5 to 16% of sugar
   (c) 2 to 5% of a stabilizer and to make 100%, of water,
   in which said stabilizer comprises:
   (d) 48 to 62% of caseinate
   (e) 16 to 22% of sugar
   (f) 7 to 10% of a sorbitan partial ester of a fatty acid in which the fatty acid contains 12 to 20 carbon atoms
   (g) 1.5 to 3.0% of a polyoxyethylene adduct of a sorbitan partial ester of a fatty acid in which the fatty acid contains 12 to 20 carbon atoms and the ethylene oxide units average in the range of 12 to 25 and
   (h) 6 to 14% of a lactylate having the formula

in which
   $n$ is an integer of 1 to 5,
   RCO is the acyl radical of a fatty acid containing from 12 to 24 carbon atoms.

2. A composition according to claim 1 in which there is employed:
   20 to 27% of said (a)
   11 to 15% of said (b)
   2.5 to 4.0% of said (c)
   50 to 60% of said (d)
   17 to 21% of said (e)
   7.5 to 9.5% of said (f)
   1.8 to 2.8% of said (g)
   7.5 to 12% of said (h)

3. A composition according to claim 1 wherein
   said (b) is can sugar
   said (d) is sodium caseinate
   said (e) is cane sugar
   said (f) is sorbitan monostearate
   said (g) is sorbitan monostearate having an average of 20 units of ethylene oxide and
   said (h) is calcium stearyl-2 lactylate.

4. A composition according to claim 1 wherein
   said (b) is cane sugar
   said (d) is sodium caseinate
   said (e) is cane sugar
   said (f) is sorbitan monostearate
   said (g) is a mixture of sorbitan monostearate and sorbitan monooleate, each having an average of 20 units of ethylene oxide and said (h) is calcium stearyl-2 lactylate.

5. A composition according to claim 2 wherein
   said (b) is a mixture of cane sugar and corn syrup solids and
   said (e) is a mixture of cane sugar and corn syrup solids.

6. A composition according to claim 1 wherein said stabilizer contains additionally

|  | Percent |
|---|---|
| Sodium chloride | 3 to 5 |
| Bodying agent | 0.5 to 1.5 |
| and |  |
| Flavoring and coloring agents | 0.05 to 0.25 |

7. A composition comprising, on a weight basis:

|  | Percent |
|---|---|
| Vegetable fat | 26.00 |
| Cane sugar | 14.00 |
| Stabilizer | 3.54 |
| Water | 56.46 |
|  | 100.00 | said stabilizer consisting of:

| | Percent |
|---|---|
| Sodium caseinate | 2.000 |
| Sorbitan monostearate | 0.300 |
| Sorbitan monostearate having an average of 20 units of ethylene oxide | 0.050 |
| Sorbitan monooleate having an average of 20 units of ethylene oxide | 0.050 |
| Calcium stearyl-2 lactylate | 0.300 |
| Carrageen | 0.025 |
| Salt | 0.150 |
| Cane sugar | 0.659 |
| B-carotene | 0.004 |
| Egg color | 0.002 |
| | 3.540 |

References Cited

UNITED STATES PATENTS 3,224,883  12/1965  Pader et al. ____ 99—139
3,244,634  4/1966  Buddemeyer ____ 99—91

FOREIGN PATENTS 930,461  7/1963  Great Britain.

RAYMOND N. JONES, *Primary Examiner.*

A. LOUIS MONACELL, *Examiner.*

J. M. HUNTER, *Assistant Examiner.*